3,419,596
ARALIPHATIC ISONITRILES
Uwe Fetzer, Leverkusen, Ulrich Eholzer, Cologne-Stammheim, Ivar Ugi, Leverkusen, Ingeborg Hammann, Cologne, and Günter Unterstenhöfer, Opladen, Germany, assignors to Farbenfabriken Bayer Aktiengesellschaft, Leverkusen, Germany, a corporation of Germany
No Drawing. Filed June 28, 1965, Ser. No. 467,711
Claims priority, application Germany, July 9, 1964,
F 43,387
11 Claims. (Cl. 260—465)

ABSTRACT OF THE DISCLOSURE

Araliphatic isonitriles having the formula

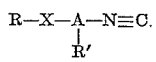

in which A is $C_{1-4}$ aliphatic, X is a C—C bond or —S—, and R and R' each respectively is phenyl or chloro-, $C_{1-4}$ alkyl- and/or $C_{1-4}$ alkoxy-substituted phenyl, which possess biocidal properties, especially insecticidal, acaricidal and fungicidal properties, and which may be produced by conventional methods.

---

The present invention relates to particular polynuclear araliphatic isonitriles, to their compositions, as well as to the production and use thereof.

It has already been disclosed that aliphatic and mononuclear araliphatic isonitriles with 13–26 carbon atoms have insecticidal activity (U.S. Patent No. 3,012,932) and that 2,6-dichlorophenyl-isocyanide, in particular, has fungicidal activity (Belgian Patent No. 625,036).

It is an object of the present invention to provide particular araliphatic isonitriles which possess valuable properties.

It is another object of the present invention to provide particular new araliphatic isonitriles which exhibit pesticidal properties, and especially insecticidal and acaricidal properties, as well as fungicidal properties, rendering such isonitriles useful in various practical applications.

It is another object of the present invention to provide such araliphatic isonitriles which possess a higher degree of potency as well as a higher degree of activity than presently known biocidal isonitriles, as regards pesticidal, and in particular insecticidal and acaricidal, activity, as well as fungicidal activity.

It is another object of the present invention to provide araliphatic isonitriles of the foregoing type which possess a multiple effect and which thus provide a broad spectrum of biocidal application.

It is another object of the present invention to provide araliphatic isonitriles of the foregoing type which possess a distinctly low toxicity toward warm-blooded animals as well as a distinctly low phytotoxicity, yet which possess a particularly strong biocidal action.

It is another object of the present invention to provide araliphatic isonitriles of the foregoing type possessing properties which in biocidal use, contemplating pesticidal and especially insecticidal and acaricidal, as well as fungicidal, use, result in rapidly commenced and long-lasting action and effectiveness.

It is another object of the present invention to provide araliphatic isonitriles of the foregoing type useful specifically against harmful sucking and biting insects, Diptera and mites.

It is still another object of the present invention to provide a process for producing particular araliphatic isonitriles of the foregoing type in a versatile and efficient manner which leads to comparatively high yields.

It is still another object of the present invention to provide specifically a dehydration process for producing araliphatic isonitriles of the foregoing type, utilizing a suitable corresponding formamide and a water-eliminating acyl halide in the presence of an acid binding agent or base, whereby upon water elimination the desired corresponding araliphatic isonitrile is produced.

It is still another object of the present invention to provide such a process which may be carried out either in solution or suspension, such as in the presence of an inert organic solvent.

It is still another object of the present invention to provide such a process which may be carried out at a temperature within a comparatively wide range, including temperatures below room temperature as well as elevated temperatures.

It is a further object of the present invention to provide compositions with carrier vehicles of araliphatic isonitriles of the foregoing type which may be utilized for biocidal purposes, such as pesticidal, especially insecticidal and acaricidal, as well as fungicidal, purposes.

It is a further object of the present invention to provide such compositions in the form of mixtures with a dispersible carrier vehicle, such as a dispersible carrier liquid or dispersible carrier solid, of araliphatic isonitriles of the foregoing type with the particular araliphatic isonitrile being present in the mixture in a biocidally, i.e., pesticidally, especially insecticidally and/or acaricidally, as well as fungicidally, effective amount.

It is still a further object of the present invention to provide methods of using araliphatic isonitriles of the instant type in a new way.

It is still a further object of the present invention to provide a method of combating pests, and especially insects and/or acarids, which contemplates applying to such pests, and especially to such insects and/or acarids, and their habitat, a biocidally, such as a pesticidally, especially insecticidally and/or acaricidally, effective amount of an araliphatic isonitrile of the instant type.

It is still a further object of the present invention to provide a method of combating fungi which contemplates applying to such fungi and their habitat a fungicidally effective amount of an araliphatic isonitrile of the instant type.

It is still a further object of the present invention to provide a method of combating such pests and/or fungi which contemplates applying the particular araliphatic isonitrile in the form of a composition with a carrier vehicle, as noted above.

It is still a further object of the present invention to provide for the use of araliphatic isonitriles of the instant type as hygiene control agents, crop control agents, pesticidal, such as insecticidal and/or acaricidal, as well as fungicidal, agents in particular, and the like, utilizing comparatively low quantities and/or concentrations of the particular araliphatic isonitrile of the instant type.

Other and further objects of the present invention will become apparent from a study of the within specification and accompanying examples.

It has been found in accordance with the present invention that particular araliphatic isonitriles having the general formula

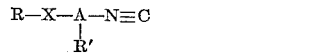

in which A is an aliphatic radical having 1 to 8 carbon atoms inclusive, X is a member selected from the group consisting of a carbon-carbon bond and a sulfur atom, and R and R' each respectively is selected from the group consisting of an aromatic radical containing 1 to 3 rings with 5 to 6 nuclear members per ring and an aromatic radical containing 1 to 3 rings with 5 to 6 nuclear members per ring which is substituted with a member selected from the group consisting of chloro, alkyl radicals having 1 to 4 carbon atoms, inclusive, and alkoxy radicals having 1 to 4 carbon atoms, inclusive, possess strong insecticidal, acaricidal and fungicidal properties.

Furthermore, in accordance with the present invention, a versatile and efficient process for the production of araliphatic isonitriles of general Formula I is now provided, which comprises reacting a formamide of the general formula

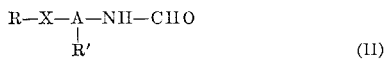

(II)

in which A, X, R and R' are the same as defined above, with a water-eliminating acyl halide in the presence of an acid binding agent, to form the corresponding araliphatic isonitrile.

It is extremely surprising that the particular new polynuclear isonitriles according to the present invention have a substantially higher insecticidal, acaricidal and fungicidal activity than the known biocidal isonitriles.

The instant diaraliphatic isonitriles also have a multiple effect. The compounds according to the present invention are thus a valuable addition to the art in providing agents having a broad spectrum of biocidal application.

In accordance with a specific embodiment of the present invention, when 4,4'-dichlorobenzohydryl-formamide is reacted with phosgene and triethylamine, the course of the reaction can be illustrated by the following equation:

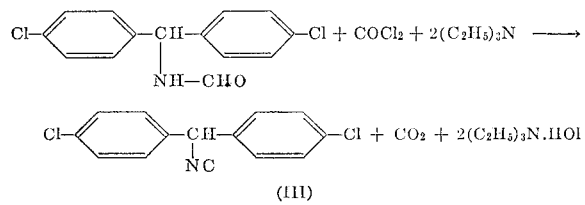

(III)

As water-eliminating acyl halides which may be used in accordance with the process of the present invention, there may be mentioned, in particular, phosgene, methane-sulfochloride, benzene-sulfochloride, phosphorus oxychloride, phosphorus oxybromide and cyanuric chloride.

Typical preferred acid binding agents or bases used in accordance with the present invention include alkali metal carbonates, such as sodium carbonate, potassium carbonate, and the like; tertiary amines, and especially tertiary alkylamine, such as trimethylamine, triethylamine, diethylmonomethylamine, tripropylamine, tetramethyl-ethylene-diamine, dimethylcyclohexylamine, and the like, such alkylamines thus contemplating $C_1$–$C_6$ trilower alkylamines having various straight and branched chain substituents, including methyl, ethyl, n-propyl, isopropyl, n-butyl, isobutyl, sec.-butyl, tert.-butyl, the amyls, and the hexyls, as well as $C_5$–$C_6$ cyclo-lower alkyl substituted amines, including cyclopentyl, cyclohexyl, and the like, and corresponding mixed dialkyl- and monocycloalkyl substituted- and monoalkyl-dicycloalkyl substituted-amines wherein the alkyl substituent or substituents and the cycloalkyl substituent or substituents contemplate the foregoing enumerated substituents; dialiphatic-mononuclear araliphaticamines, and especially di-$C_1$–$C_6$ lower alkyl-mononuclear $C_6$ aryl-$C_1$–$C_6$ lower alkyl-amines, such as dimethyl-benzyl-amine, and the like; $C_6$–$C_{10}$ heterocyclic-amines, and especially mononuclear $C_6$ heterocyclic and dinuclear $C_{10}$ heterocyclic amines, such as pyridine, quinoline, and the like; alkali metal alkoxides, and especially $C_1$–$C_6$ lower tert.-alkylolates, such as sodium-, potassium-, etc. tert.-butoxides, tert.-amyloxides, tert.-hexyloxides, and the like; and mixtures of such acid binding agents.

Especially advantageous combinations of acyl halides and bases in accordance with the present invention are phosgene and tertiary aliphatic amines, benzene-sulfochloride and pyridine, phosphorus oxychloride and pyridine or potassium-tert.-butylate, and cyanuric chloride and potassium carbonate.

The formamides usable in the process according to the present invention are subjected to dehydration in solution or suspension.

As such solution or suspension agents, there may be used in accordance with the present invention all inert organic solvents, preferably hydrocarbons, such as aliphatic hydrocarbons, especially paraffins, including petroleum fractions such as petroleum fractions having a boiling point between about 30 and 160° C., especially $C_5$–$C_9$ aliphatic hydrocarbons, and the like; cycloaliphatic hydrocarbons, such as cycloalkyl, and especially cyclolower alkyl hydrocarbons, including cyclopentane, cyclohexane, and the like; aromatic hydrocarbons, and especially unsubstituted-, as well as mono-, di-, and trilower alkyl substitued-, and nitro substituted-mononuclear aryl hydrocarbons having 6 ring carbon atoms, including benzene, toluene, xylene, mesitylene, nitrobenzene, and the like; halogenated aliphatic hydrocarbons, and especially chlorinated aliphatic hydrocarbons, including chlorinated lower alkyl and lower alkenyl hydrocarbons and especially di-, tri-, and tetrachloro-substituted lower alkyl- and lower alkenyl-hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and trichlorobenzene, and the like; ethers, such as open chain aliphatic ethers and cyclic aliphatic ethers, and especially di-$C_1$–$C_6$ lower alkyl ethers, including dimethyl ether, diethyl ether, methylethyl ether, diisopropyl ether, diisobutyl ether, and the like, as well as cycloalkyl- and cycloalkenyl-ethers, including dioxan, furan, tetrahydrofuran, and the like; esters, and especially $C_1$–$C_4$ alkylalkanoyloxy esters, including methyl, ethyl, propyl, butyl, etc., esters of formic, acetic, propionic, butyric, etc., acids, especially ethyl acetate, and the like; nitriles, and especially aliphatic nitriles, such as alkane nitriles, for example $C_1$–$C_4$ lower alkyl cyanides, including acetonitrile, propionitrile, butyronitrile, and the like; tert.-butanol, and the like; amines, such as heterocyclic amines, and especially cyclic amines having 6 ring members, including at least one nitrogen atom, including pyridine, as well as aliphatic amines, and especially tert.-aliphatic amines, such as tri-$C_1$–$C_4$ lower alkylamines, including trimethylamine, triethylamine, tripropylamine, tributylamine, methylethylpropylamine, diethylbutylamine, and the like; ketones, and especially aliphatic ketones, including dialkyl ketones, for example di-$C_1$–$C_4$ lower alkyl ketones, such as acetone, methylethyl ketone, diethyl ketone, methyl isopropyl ketone, methyl isobutyl ketone, and the like; and mixtures of such solvents.

The dehydration reaction in accordance with the present invention is carried out within a comparatively wide temperature range, such as at a temperature substantially between about −50 to +100° C., preferably substantially between about −20 to +60° C.

In accordance with a particular embodiment of the present invention, 1 mol of the formamide is reacted in substantially between about 0.5–5 liters of solvent with substantially between about 1–5, preferably 1.8–3, equivalents of base, and substantially between about 0.5–2.5, preferably 0.9–1.5, water equivalents of acyl halide.

The process of the invention can be carried out continuously and/or, if desired, under increased or reduced pressure.

Working up of the product is carried out by mixing the reaction mixture with water, separating and concentrating, or by the addition of ammonia, filtration and concentration. The crude product can be purified by washing or crystallization or reprecipitation, if desired with the use of an additive capable of adsorbing impurities.

Typical examples of polynuclear diaraliphatic isonitriles contemplated by the present invention include: benzohydryl isocyanide; 4-chloro-, 4-methyl-, and 4-methoxy-benzohydryl isocyanide; 2,4'-, 3,4'- and 4,4'-dichlorobenzohydryl isocyanide; 2,5,4'- and 3,4,4'-trichlorobenzohydryl isocyanide; 4,4'-dimethoxybenzohydryl isocyanide; 1,2- and 2,2-diphenyl-ethyl isocyanide; 3,4-diphenyl-1-butyl isocyanide; 3-benzyl-4-phenyl-1-butyl isocyanide; α-diphenyl-ethyl isocyanide; 1,3-diphenyl-allyl isocyanide; 1,3-diphenylpropargyl isocyanide; 1-isocyano-1-phenyl-2-(4'-tert.-butyl-phenyl-mercapto)ethane; and the like.

The new compounds according to the present invention have strong insecticidal and acaricidal actions or effects but a low toxicity towards warm-blooded animals and a low phytotoxicity. These pesticidal effects appear rapidly and are long-lasting. The instant compounds can, therefore, be used with very good results for combating noxious sucking and biting insects, Diptera and mites.

In this connection, the sucking insects contemplated herein essentially include aphids, such as the peach aphid (*Myzus persicae*); coccids, such as *Aspidiotus hederae*; Thysanoptera, such as *Hercinothrips femoralis*; and bugs, such as the beet leaf bug (*Piesma quadrata*); and the like.

In the same way, the biting insects in question essentially include butterfly larvae, such as *Plutella maculipennis*; bettles, such as grain weevils (*Calandra granaria*), but also species living in the soil, such as wire worms (*Agriotes sp.*); cockroaches, such as the German cockroach (*Blattella germanica*); Orthoptera, such as the cricket (*Gryllus domesticus*); termites, such as Reticulitermes; and Hymenoptera, such as ants; and the like.

Also, the Dipteria contemplated herein essentially comprise the flies, such as the banana fruit fly (*Drosophila melanogaster*), the house fly (*Musca domestica*), and gnats, such as the mosquito (*Aedes aegypti*); and the like.

Especially important among the mites contemplated herein are the spider mites (Tetranychidae), such as the common spider mite (*Tetranychus telarius*); gall mites, such as the red currant gall mite (*Eriophyes ribis*) and Tarsonemides, such as *Tarsonemus pallidus*; and ticks; and the like.

Significantly, the instant isonitriles also exhibit marked fungitoxic properties and can, therefore, be used for combating phytopathogenic fungi, and because of the good plant compatibility of such compounds, the same may be used for crop control purposes, such as for combating fungus blights in agricultural plants.

Thus, the present invention provides for utilizing the instant araliphatic isonitriles for combating the generally regarded hygiene pests, including insects and acarids, and because of their comparatively good compatibility with higher plants, such compounds may be used with advantage as plant protective agents, for example to protect such plants against pests and fungi, as the case may be. The low degree of mammalian toxicity as compared with the comparatively high degree of biocidal activity of the instant compounds renders such compounds extremely well suited to handling and manipulation in preparing formulations which may be used manually or by automatic equipment for applying the same to any surface, including indoor and outdoor surfaces and even plants and surrounding soil, whereby to control and minimize the insect problem and/or the fungus problem as it may occur in a given situation.

Thus, the instant compounds can be used as pesticides and/or fungicides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulfiable concentrate, spray powder, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercial preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.005 and 5.0% by weight, and preferably 0.01 and 3.0% by weight, of the mixture. Thus, such mixtures over-all contemplate an amount of the active compound which is effective for the purpose in question and which is generally between about 0.005 and 95% by weight of the mixture. Thus, the instant formulations or compositions are applied in the usual manner, for example, by watering, spraying, atomizing, vaporizing, scattering, and the like.

The following examples are given for the purpose of illustrating, while not limiting, the utility of the new compounds according to the present invention.

EXAMPLE 1

Plutella test

| | Parts by wt. |
|---|---|
| Solvent: Dimethyl formamide | 3 |
| Emulsifier: Alkyl-aryl polyglycol ether | 1 |

To produce a suitable preparation of the active compound, 1 part by weight of such active compound is mixed with the stated amount of solvent containing the stated amount of emulsifier, and then the concentrate obtained is diluted with water to provide the desired concentration.

Cabbage leaves (*Brassica oleracea*) are sprayed with the preparation of the particular active compound until dew moist and infested with caterpillars of the diamondback moth (*Plutella maculipennis*).

After the specified periods of time, the degree of destruction is determined percentagewise. 100% indicates that all of the caterpillars are killed, whereas 0% indicates that none of them is killed.

The active compounds, their concentrations, the evaluation times, and the results obtained can be seen from Table 1 which follows:

TABLE 1.—PLANT DAMAGING INSECTS

| Active Compound | Concentration of Active Compound in percent | Degree of destruction in percent after 4 days |
|---|---|---|
| 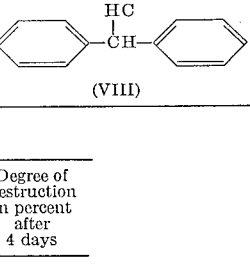 (IV) | 0.2<br>0.02 | 100<br>100 |
|  (V) | 0.2<br>0.02 | 100<br>80 |
|  (III') | 0.02<br>0.02 | 100<br>40 |
|  (VI) | 0.2<br>0.02 | 100<br>90 |
|  (VII) | 0.2 | 100 |

TABLE 2.—PLANT-DAMAGING INSECTS

| Active Compound | Concentration of Active Compound in percent | Degree of destruction in percent after 24 hours |
|---|---|---|
| 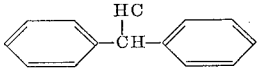 (VIII) | 0.2<br>0.02 | 100<br>60 |

EXAMPLE 2
Myzus test (contact action)

Parts by wt.
Solvent: Dimethyl formamide _____ 3
Emulsifier: Alkyl-aryl polyglycol ether _____ 1

To produce a suitable preparation of the active compound, 1 part by weight of such active compound is mixed with the stated amount of solvent containing the stated amount of emulsifier, and then the concentrate obtained is diluted with water to provide the desired concentration.

Cabbage plants (*Brassica oleracea*), which have been heavily infested with peach aphids (*Myzus persicae*), are sprayed with the preparation of the particular active compound until dripping wet.

After the specified periods of time, the degree of destruction is determined percentagewise. 100% indicates that all of the aphids are killed, whereas 0% indicates that none of them is killed.

The active compound, its concentration, the evaluation time, and the results obtained can be seen from Table 2 as follows:

EXAMPLE 3
Doralis test (contact action)

Parts by wt.
Solvent: Diethyl formamide _____ 3
Emulsifier: Alkyl-aryl polyglycol ether _____ 1

To produce a suitable preparation of the active compound, 1 part by weight of such active compound is mixed with the stated amount of solvent containing the stated amount of emulsifier, and then the concentrate obtained is diluted to provide the desired concentration.

Bush bean plants (*Vicia faba*) which have been strongly infested with black bush bean aphids (*Doralis fabae*) are sprayed with the preparation of the particular active compound until dripping wet.

After the specified periods of time, the degree of destruction is determined percentagewise; 100% indicates that all of the aphids are killed, whereas 0% indicates that none of them is killed.

The active compound, its concentration, the evaluation time, and the results obtained can be seen from Table 3 as follows:

TABLE 3.—PLANT-DAMAGING INSECTS

| Active Compound | Concentration of Active Compound in percent | Degree of destruction in percent after 24 hours |
|---|---|---|
| 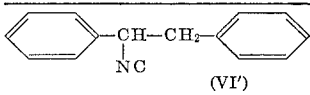 (VI') | 0.2 | 100 |

EXAMPLE 4

Tetranychus test

| | Parts by wt. |
|---|---|
| Solvent: Dimethyl formamide | 3 |
| Emulsifier: alkyl-aryl polyglycol ether | 1 |

To produce a suitable preparation of the active compound, 1 part by weight of such active compound is mixed with the stated amount of solvent containing the stated amount of emulsifier, and the concentrate obtained is diluted with water to produce the desired concentration.

Bean plants (*Phaseolus vulgaris*), which have a height of approximately 10–30 cm., are sprayed with the preparation of the particular active compound until dripping wet. These bean plants are heavily infested with spider mites (*Tetranychus telarius*) in all stages of development.

After the specified periods of time, the effectiveness of the preparation of the given active compound is determined by counting the dead mites. The degree of destruction thus obtained is expressed percentagewise. 100% indicates that all of the spider mites are killed, whereas 0% indicates that none of them is killed.

The active compounds, their concentration, the evaluation time, and the results obtained can be seen from Table 4 as follows:

TABLE 4.—PLANT-DAMAGING MITES

| Active Compound | Construction of Active Compound in percent | Degree of destruction in percent after 8 days |
|---|---|---|
| Cl—⟨ ⟩—CH(NC)—⟨ ⟩—Cl  (III″) | 0.2 / 0.02 | 100 / 100 |
| (2,4-Cl)—⟨ ⟩—CH(NC)—⟨ ⟩—Cl  (IV′) | 0.2 / 0.02 | 100 / 100 |
| Cl—⟨ ⟩—CH(NC)—⟨ ⟩  (V′) | 0.2 / 0.02 | 100 / 99 |
| ⟨ ⟩—CH(NC)—⟨ ⟩  (VIII′) | 0.2 / 0.02 | 100 / 98 |
| ⟨ ⟩—CH(NC)—CH$_2$—⟨ ⟩  (VI″) | 0.2 / 0.02 | 100 / 90 |
| ⟨ ⟩—CH(NC)—CH$_2$—S—⟨ ⟩—C(CH$_3$)$_3$  (VII′) | 0.2 / 0.02 | 100 / 80 |
| n—C$_{12}$H$_{25}$—NC (known) (A) | 0.02 | 0 |

The following examples are given for the purpose of illustrating, while not limiting, the present invention as concerns the process for producing the instant compounds.

EXAMPLE 5

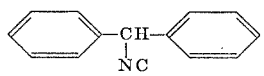
(VIII″)

211 parts by weight N-formyl-benzohydrylamine, 2500 parts by weight methylene chloride and 250 parts by weight triethylamine are cooled to 0° C., while stirring. Then, 99 parts by weight phosgene are introduced at 0–5° C., with vigorous stirring, into the reaction mixture which is initially warmed to +15° C. When the vigorous evolution of carbon dioxide has subsided, the reaction mixture is heated at boiling temperature for 15 minutes. The mixture is cooled, then mixed with 2500 parts by weight ice water, and the resulting layers are separated; the organic phase is washed twice with water, dried over calcined sodium sulfate and concentrated under vacuum. The mixture is triturated with petroleum ether, cooled to 0° C. and filtered off with suction. Yield: 145 parts by weight benzohydryl isonitrile; M.P. 35–36° C.

EXAMPLE 6

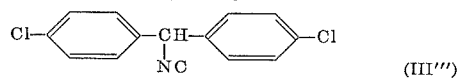
(III‴)

64 parts by weight N-formyl-4,4′-dichlorobenzohydrylamine, 750 parts by weight methylene chloride and 60 parts by weight triethylamine are cooled to 0° C., while stirring. Then, 23 parts by weight phosgene are introduced at 0–5° C., with vigorous stirring, into the reaction mixture which is initially warmed to +15° C. When the vigorous evolution of carbon dioxide has subsided, the reaction mixture is heated at boiling temperature for 15 minutes. The mixture is cooled, then mixed with 1000 parts by weight water, and the resulting layers separated; the organic phase is washed twice with water, dried over calcined sodium sulfate and concentrated under vacuum. The mixture is treated with a mixture of cyclohexane and ether (4:1) and filtered off with suction after 2 days. Yield: 37 parts by weight 4,4′-dichlorobenzohydryl isonitrile; M.P. 73–74° C.

EXAMPLE 7

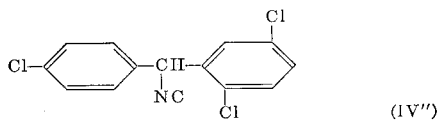

58 parts by weight N-formyl-2,5,4′-trichlorobenzohydrylamine, 750 parts by weight methylene chloride and 48 parts by weight triethylamine are cooled to 0° C., while stirring. Then, 18.5 parts by weight phosgene are introduced at 0–5° C., with vigorous stirring, into the reaction mixture which is initially warmed to +15° C. When the vigorous evolution of carbon dioxide has subsided, the reaction mixture is heated at boiling temperature for 15 minutes. The mixture is cooled, then mixed with 750 parts by weight water, and the resulting layers are separated; the organic phase is washed twice with water, dried over calcined sodium sulfate and concentrated under vacuum. The mixture is triturated with petroleum ether, cooled to 0° C. and filtered off with suction after 2 days. Yield: 38 parts by weight 2,5,4′-trichlorobenzohydryl isonitrile; M.P. 63–64° C.

EXAMPLE 8

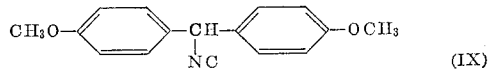

36 parts by weight N-formyl-4,4′-dimethoxybenzohydrylamine, 38 parts by weight triethylamine and 500 parts by weight methylene chloride are cooled to 0° C., while stirring. Then, 13.5 parts by weight phosgene are introduced at 0–5° C., with vigorous stirring, into the reaction mixture which is initially warmed to +15° C. When the vigorous evolution of carbon dioxide has subsided, the reaction mixture is heated at boiling temperature for 15 minutes. The mixture is cooled, then mixed with 500 parts by weight ice water, and the resulting layers are separated; the organic phase is washed twice with water, dried over calcined sodium sulfate and concentrated under vacuum. The mixture is triturated with petroleum ether, cooled to 0° C. and filtered off with suction. Yield: 28 parts by weight 4,4′-dimethoxybenzohydryl isonitrile; M.P. 124–128° C.

EXAMPLE 9

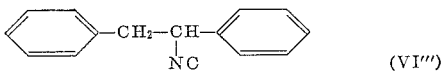

112 parts by weight 1-formylamino-1,2-diphenylethane (M.P. 107° C., prepared from desoxy benzoin by a Leuckart reaction) are dissolved in 1000 parts by weight methylene chloride and 120 parts by weight triethylamine. Then, 50 parts by weight phosgene are introduced at boiling temperature, while stirring. Stirring is continued for 10 minutes, excess of phosgene is removed by blowing in nitrogen, and ammonia is introduced to saturation. After filtering off with suction from the precipitated ammonium chloride, the filtrate is concentrated under vacuum. By extracting the residue with petroleum ether, 1-isocyano-1,2-diphenylethane is obtained; M.P. 29–30° C. Yield: 32 parts by weight.

EXAMPLE 10

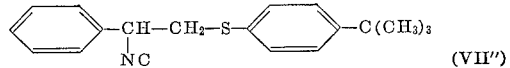

From 4-tert.-butyl-thiophenol and α-chloracetophenone there is obtained, in a yield of 79%, S-phenacyl-4-tert.-butyl-thiophenol in the form of a pale yellow liquid (B.P. 180–182° C./0.06 mm. Hg) and from this, by a Leuckart reaction, in a yield of 93%, 1-phenyl-1-formylamino-2-(4-tert.-butyl-phenylmercapto)ethane. Into a solution of 160 parts by weight of the last-mentioned compound in 1000 parts by weight methylene chloride and 120 parts by weight triethylamine, 50 parts by weight phosgene are introduced at 5–10° C. within a period of 1 hour, while stirring. The mixture is further stirred for 20 minutes without cooling, heated to boiling temperature for 5 minutes, and a vigorous ammonia current then introduced at 10–20° C. for 30 minutes. After filtering off with suction from the precipitated ammonium chloride, the residue is washed with methylene chloride, and the combined filtrates concentrated under vacuum. Yield: 130 parts by weight crude 1-phenyl-2-(4-tert.-butyl-phenylmercapto)ethyl-1 isocyanide.

Accordingly, the present invention contemplates the production of araliphatic isonitriles having general Formula I above, by reacting a formamide of general Formula II above with a water-eliminating acyl halide in the presence of an acid binding agent or base, whereby upon dehydration the corresponding araliphatic isonitrile is formed, and especially diaryl-aliphatic nitriles having the formula

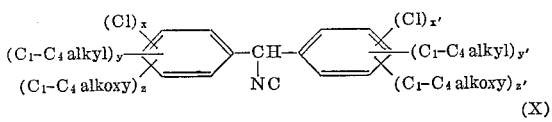

and having the formula

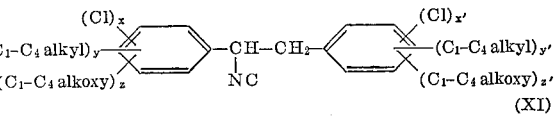

and having the formula

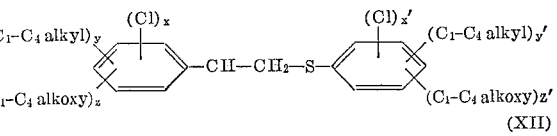

wherein $x$ and $x'$ each respectively is a whole number having a value from 0 to 2 inclusive, $y$, $y'$, $z$ and $z'$ each respectively is a whole number having a value from 0 to 1.

Biocidal, such as pesticidal and fungicidal, compositions are also contemplated in accordance with the present invention which include a mixture of a dispersible carrier vehicle, such as a dispersible carrier liquid or a dispersible carrier solid, and a biocidally, especially pesticidally and fungicidally, effective amount of an araliphatic isonitrile of the foregoing type, the isonitrile being present, of course, in an amount substantially between about 0.005 and 95% by weight of the mixture, and especially in the case of field application or direct application formulations, in an amount of between about 0.005 and 5.0%, preferably 0.01 and 3.0%, by weight of such mixture.

Furthermore, methods of using the instant compounds are also contemplated, including especially a method of combating pests, such as insects and/or acarids, by applying to such pests, and especially insects and/or acarids, and their habitat a biocidally, especially pesticidally, effective amount of an araliphatic isonitrile of the instant type, either alone or in admixture with a dispersible carrier vehicle of the foregoing type in the above-noted field application or direct application proportions. Also contemplated is a method of combatting fungi by applying to such fungi and their habitat a pesticidally effective amount of araliphatic isonitriles of the instant type either alone or in admixture with a dispersible carrier vehicle of the foregoing type, such as in a field application or direct application proportion as noted above.

The foregoing araliphatic isonitriles of the present invention indeed possess a higher degree of potency as well as a higher degree of activity than presently known biocidal isonitriles, especially as regards pesticidal, and in particular insecticidal and acaricidal, activity, as well as fungicidal activity. Such araliphatic isonitriles further possess a multiple effect which is rapidly commenced and long-lasting in action and effectiveness and which thus renders the instant compounds usable over a broad spectrum of biocidal application. This is especially true considering the distinctly low toxicity toward warm-blooded animals as well as the distinctly low phytotoxicity of these compounds and the concomitant ease of their manipulation and use in the field because of such properties. Of course, the instant compounds are especially useful in crop control techniques in ridding plant crops of harmful sucking and biting insects, Diptera, mites, and the like.

Generally, the instant araliphatic isonitriles are, therefore, useful as hygiene control agents, in particular crop control agents, such as biocidal, and especially pesticidal, including insecticidal and acaricidal, as well as fungicidal, agents, whereby comparatively low quantities and/or concentrates of the particular compound may be utilized with extremely rapid and long-lasting action and effects.

In particular, in general Formula I, R and R' each respectively contemplates aromatic hydrocarbon radicals having 1 to 3 rings, with 5 to 6 nuclear members in each ring, and especially unsubstituted and substituted phenyl radicals, such as the phenyl radical as well as monochlorophenyl, dichlorophenyl, mono-methyl-, -ethyl-, -n-propyl-, -isopropyl-, -n-butyl-, -isobutyl-, -sec.-butyl-, and -tert.-butyl-phenyl radicals, as well as mono-methoxy-, -ethoxy-, -n-propoxy-, -isopropoxy-, -n-butoxy-, isobutoxy-, -sec.-butoxy-, and -tert.-butoxy-phenyl radicals, and chloro-$C_1$–$C_4$ alkyl/$C_1$–$C_4$ alkoxy mixed substituted phenyl radicals.

As for A in general Formula I, this contemplates $C_1$–$C_8$ aliphatic, e.g., $C_1$–$C_4$ aliphatic hydrocarbon and especially lower-alkylidene (-alkylidyne) and/or lower alkylene radicals linking the isocyanide group with the R and R' radicals in question. Preferably, A is an unsubstituted and/or saturated lower alkylene linking radical which may be connected with R through a linking sulfur atom in the case where X is sulfur and which otherwise is linked directly with the R radical by a carbon-carbon bond.

As the artisan will appreciate, utilizing the procedure of Example 5, with appropriate molar amounts of the starting reactants, α-diphenyl-ethyl isonitrile is produced. Additionally, Example 6 may be repeated using corresponding molar amounts of the starting reactants, whereby correspondingly 2,4'-dichlorobenzohydryl isonitrile and 3,4'-dichlorobenzohydryl isonitrile are produced. Further, using the procedure of Example 7 with corresponding molar amounts of the starting reactants, 3,4,4'-trichlorobenzohydryl isonitrile is formed. Also, using the procedure of Example 8 with corresponding molar amounts of the starting reactants, 4-methoxybenzohydryl isonitrile is formed. In the same way, utilizing the procedure of Example 8, for instance, with corresponding molar amounts of the starting reactants, 4-methyl-benzohydryl isonitrile is formed. In connection with the procedure of Example 9, for instance, it will be appreciated also that where the procedure of this example is repeated, using corresponding molar amounts of the starting reactants, 2,2-diphenyl-ethyl isonitrile; 3,4-diphenyl-1-butyl isonitrile; 3-benzyl-4-phenyl-1-butyl isonitrile; 1,3-diphenyl-allyl isonitrile; and 1,3-diphenyl-propargyl isonitrile; correspondingly are formed. Each of these compounds, of course, possesses the desired biocidal activity noted above.

Accordingly, it will be appreciated that the aliphatic radical A utilized in Formula I hereinabove also contemplates unsaturated $C_1$–$C_8$ carbon chains, including branched chains, such that R and R' as well as the isonitrile group of Formula I may be linked to the aliphatic radical A through different carbon atoms as well as through the same carbon atom. Of course, radical R may be linked to the corresponding aliphatic radical A through a sulfur atom linkage in that case where X is sulfur in Formula I above.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Araliphatic isonitriles having the general formula

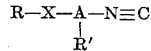

in which A is an aliphatic hydrocarbon radical having 1 to 4 carbon atoms inclusive, X is a member selected from the group consisting of a carbon-carbon bond and a sulfur atom, and R and R' each respectively is selected from the group consisting of phenyl and substituted phenyl which is selected from the group consisting of chlorophenyl, dichlorophenyl, alkylphenyl having 1 to 4 carbon atoms, inclusive, in the alkyl moiety and alkoxyphenyl having 1 to 4 carbon atoms, inclusive, in the alkoxy moiety.

2. Diaryl-aliphatic isonitriles having the formula

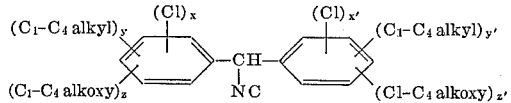

in which $x$ and $x'$ each respectively is a whole number having a value from 0 to 2, inclusive, $y$, $y'$, $z$ and $z'$ each respectively is a whole number having a value from 0 to 1, and in which the corresponding $C_{1-4}$ alkyl and $C_{1-4}$ alkoxy group is in para-position when the corresponding number $y$, $y'$, $z$ and $z'$ is 1.

3. Diaryl-aliphatic isonitriles having the formula

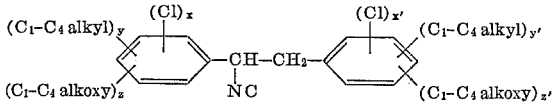

in which $x$ and $x'$ each respectively is a whole number having a value from 0 to 2, inclusive, $y$, $y'$, $z$ and $z'$ each respectively is a whole number having a value from 0 to 1, and in which the corresponding $C_{1-4}$ alkyl and $C_{1-4}$ alkoxy group is in para-position when the corresponding number $y$, $y'$, $z$ and $z'$ is 1.

4. Diaryl-aliphatic isonitriles having the formula

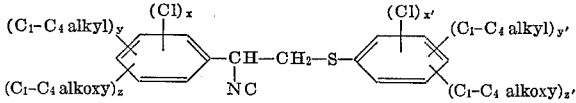

in which $x$ and $x'$ each respectively is a whole number having a value from 0 to 2, inclusive, $y$, $y'$, $z$ and $z'$ each respectively is a whole number having a value from 0 to 1, and in which the corresponding $C_{1-4}$ alkyl and $C_{1-4}$ alkoxy group is in para-position when the corresponding number $y$, $y'$, $z$ and $z'$ is 1.

5. 4,4'-dichlorobenzohydryl isonitrile having the formula

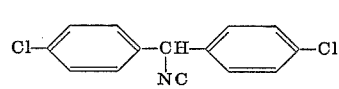

6. 2,5,4'-trichlorobenzohydryl isonitrile having the formula

7. 4-chlorobenzohydryl isonitrile having the formula

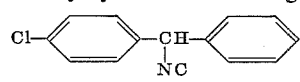

8. 1,2-diphenyl-ethyl isonitrile having the formula

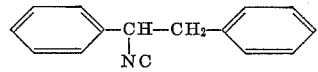

9. 1-phenyl-2-(4'-tert.-butyl-phenylmercapto)ethyl isonitrile having the formula

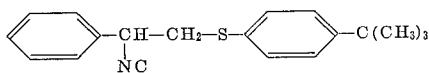

10. Benzohydryl isonitrile having the formula

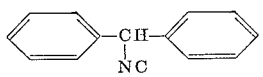

11. 4,4' - dimethoxybenzohydryl isonitrile having the formula

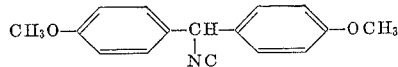

References Cited

UNITED STATES PATENTS

| | | | |
|---|---|---|---|
| 2,769,832 | 11/1956 | Reilly | 260—465 |
| 2,815,363 | 12/1957 | Rorig | 260—465 |
| 2,347,573 | 4/1944 | Moore | 167—30 |
| 2,365,936 | 12/1944 | Bruson | 167—30 |

OTHER REFERENCES

Journal of Organic Chemistry, volume 23, pp. 1221–1222.

Berichte, volume 93, pp. 239–241.

CHARLES B. PARKER, *Primary Examiner.*

S. T. LAWRENCE III, *Assistant Examiner.*

U.S. Cl. X.R.

167—30; 260—561, 464